(12) United States Patent
Wüst et al.

(10) Patent No.: US 11,689,085 B2
(45) Date of Patent: Jun. 27, 2023

(54) METHOD FOR MOUNTING A SWITCHING UNIT ON A COMPONENT OF AN ELECTRIC MOTOR

(71) Applicant: Brose Fahrzeugteile SE & Co. Kommanditgesellschaft, Würzburg, Würzburg (DE)

(72) Inventors: Stefan Wüst, Lohr am Main (DE); Oliver Haupt, Würzburg (DE)

(73) Assignee: Brose Fahrzeugteile SE & Co. Kommanditgesellschaft, Würzburg

( * ) Notice: Subject to any disclaimer, the term of this patent is extended or adjusted under 35 U.S.C. 154(b) by 696 days.

(21) Appl. No.: 16/634,447

(22) PCT Filed: Jul. 25, 2018

(86) PCT No.: PCT/EP2018/070098
§ 371 (c)(1),
(2) Date: Jan. 27, 2020

(87) PCT Pub. No.: WO2019/020659
PCT Pub. Date: Jan. 31, 2019

(65) Prior Publication Data
US 2021/0091643 A1    Mar. 25, 2021

(30) Foreign Application Priority Data
Jul. 27, 2017 (DE) ...................... 10 2017 212 995.6

(51) Int. Cl.
*H02K 15/00* (2006.01)
*H02K 3/52* (2006.01)

(52) U.S. Cl.
CPC ......... *H02K 15/0062* (2013.01); *H02K 3/522* (2013.01); *H02K 2203/06* (2013.01)

(58) Field of Classification Search
CPC ........ H02K 3/28; H02K 3/38; H02K 15/0056; H02K 15/0068; H02K 2203/06; H02K 2203/09
See application file for complete search history.

(56) References Cited

U.S. PATENT DOCUMENTS

2013/0257200 A1* 10/2013 Nakayama ............. H02K 5/225
310/71

FOREIGN PATENT DOCUMENTS

| CN | 1808851 A | 7/2006 |
|---|---|---|
| CN | 102088219 A | 6/2011 |

(Continued)

OTHER PUBLICATIONS

Machine translation of DE 102012020329 A1 (Year: 2014).*

*Primary Examiner* — Ahmed Elnakib
*Assistant Examiner* — Minki Chang
(74) *Attorney, Agent, or Firm* — Dickinson Wright PLLC

(57) ABSTRACT

A method for mounting a switching unit on a component of an electric motor, including a component of an electric motor. The component may include a plurality of teeth and coil windings, arranged on the teeth and are formed by winding wire portions, the winding wire portions protruding from the coil windings by means of winding wire ends. A switching unit, which has an arrangement of connecting conductors, is arranged on the component of the electric motor. At least some of the winding wire ends are connected to the connecting conductors of the switching unit. In order to connect the winding wire ends to the connecting conductors of the switching unit, a positioning element, operatively connected to the winding wire ends, and the switching unit are moved relative to each other along a movement plane and the winding wire ends are thereby brought into contact with the connecting conductors.

20 Claims, 10 Drawing Sheets

(56) References Cited

FOREIGN PATENT DOCUMENTS

| | | | |
|---|---|---|---|
| CN | 102738970 A | 10/2012 | |
| CN | 102801225 A | 11/2012 | |
| CN | 102891543 A | 1/2013 | |
| DE | 10301441 A1 | 11/2003 | |
| DE | 112011102869 T5 | 6/2013 | |
| DE | 102012020329 A1 * | 4/2014 | ............ H02K 3/522 |
| DE | 102012020329 A1 | 4/2014 | |
| DE | 102013113363 A1 | 6/2015 | |
| DE | 202015008207 U1 | 1/2016 | |
| EP | 2645541 A1 | 10/2013 | |
| WO | 2015091382 A1 | 6/2015 | |
| WO | 2015093182 A1 | 6/2015 | |
| WO | 2016124636 A1 | 8/2016 | |
| WO | 2017026491 A1 | 5/2018 | |

* cited by examiner

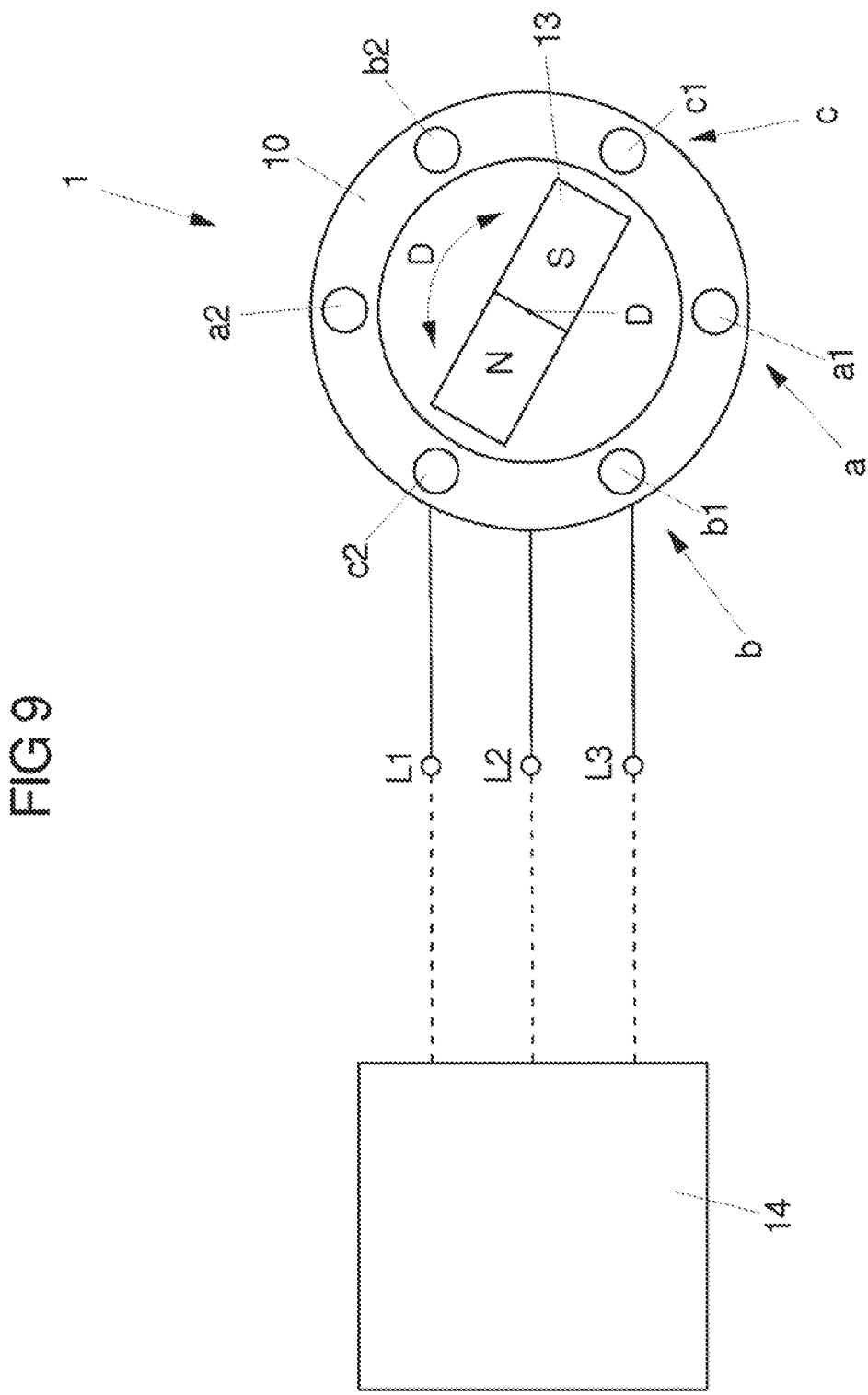

METHOD FOR MOUNTING A SWITCHING UNIT ON A COMPONENT OF AN ELECTRIC MOTOR

CROSS-REFERENCE TO RELATED APPLICATIONS

This application is the U.S. National Phase of PCT Application No. PCT/EP2018/070098 filed on Jul. 25, 2018, which claims priority to German Patent Application No. DE 10 2017 212 995.6, filed on Jul. 27, 2017, the disclosures of which are hereby incorporated in their entirety by reference herein.

TECHNICAL FIELD

This present disclosure relates to a method of assembling and an electric motor.

BACKGROUND

Conventionally, brazing has been used for example for connecting the winding wire ends to the connecting conductors. Brazing is comparatively insensitive to positional tolerances of a winding wire end to be connected to a connecting conductor, because during brazing an electrode used urges a winding wire end to be soldered against the connecting conductor and hence a brazing connection can be produced.

SUMMARY

One or more objects of the present disclosure may provide a method for mounting a switching unit on a component of an electric motor and an assembly for manufacturing an electric motor. The method and assembly may provide a simple and reliable connection between winding wire ends of coil windings and connecting conductors of a switching unit by using a welding method, in particular a laser welding method.

According to one or more embodiments, the method provides that for connecting the winding wire ends to the connecting conductors of the switching unit a positioning element, which may be operatively connected to the winding wire ends, and the switching unit are moved relative to each other along a plane of movement and the winding wire ends thereby are brought into abutment with the connecting conductors.

According to one or more embodiments, a positioning element may be used to bring the winding wire ends into abutment with the connecting conductors and thereby compensate possible positional tolerances between the winding wire ends and the connecting conductors. When the winding wire ends are in abutment with the respectively associated connecting conductors, the winding wire ends can be connected to the connecting conductors by welding, in particular by laser welding, so that a reliable electrical connection easy to produce may be created for contacting the winding wire ends with the connecting conductors of the switching unit.

Due to the fact that a positioning element jointly acts on the winding wire ends to be connected and may be operatively connected to the winding wire ends to be connected, a simple manufacturing process may be obtained. The winding wire ends are jointly brought into abutment with the respectively associated connecting conductors so that at the winding wire ends to be connected a connection can be produced by welding, in particular by laser welding.

The winding wire ends protrude from the coil windings formed by the winding wire portions preferably perpendicularly to the plane of movement along which the positioning element and the switching unit are movable relative to each other. The positioning element may be operatively connected to the winding wire ends and deflects the winding wire ends by moving in the plane of movement so that the winding wire ends get into a contacting abutment with the connecting conductors.

In one embodiment it may be provided that the positioning element and the switching unit are pivotable relative to each other about an axis of rotation in order to bring the winding wire ends into abutment with the respectively associated connecting conductors. The axis of rotation may be perpendicular to the plane of movement and for example can correspond to the axis of rotation about which a rotor of the electric motor may be rotated relative to a stator in operation of the electric motor. The positioning element and the switching unit are arranged e.g. concentrically to the axis of rotation and can be pivoted relative to each other about the axis of rotation. As a result, the winding wire ends to be connected, to which the positioning element may be operatively connected, are moved and urged into abutment with the respectively associated connecting conductors.

The switching unit, in one embodiment, for example includes a base body on which the connecting conductors are arranged. The connecting conductors are arranged for example on a side of the base body facing away from the component of the electric motor, which requires that the winding wire ends are guided through openings in the base body when the switching unit is arranged on the component of the electric motor. The winding wire ends thereby are guided into the region of the connecting conductors and can be brought into abutment with the connecting conductors via the positioning element.

The openings for example can be shaped as oblong holes in the base body. This provides for guiding the winding wire ends through the base body with a certain clearance. Within the oblong holes, the winding wire ends are movable by a relative movement of the positioning element to the switching unit in order to bring the winding wire ends into abutment with the connecting conductors.

The openings can extend longitudinally (as seen in the plane of movement) along the base body in the manner of oblong holes. In principle, however, the openings can also have another shape, for example a trapezoidal shape or a circular segmented shape.

In one embodiment, the openings can have different opening regions which are functionally separated from each other via a constriction. The constriction may be arranged such that its clear width is smaller than the diameter of the winding wire (preferably round in cross-section) so that the associated winding wire end can only forcibly be guided through the constriction. This can serve to arrest the winding wire end and keep it in abutment with the associated connecting conductor when it has been moved in the direction of the connecting conductor by action of the positioning element. When moving the positioning element relative to the switching unit, the winding wire end thus is moved out of an opening region through the constriction into another opening region of the opening of the switching unit, wherein after a relative movement of the positioning element to the switching unit the winding wire end remains in this opening region and is thereby kept in abutment with the connecting conductors.

As an alternative to constrictions between opening regions, different opening regions of an opening (of each opening) can also have different clear widths. For example, a first opening region can have such a clear width that a winding wire end can be received with a clearance and thus can easily be introduced into this first opening region. Another, second opening region on the other hand can have a reduced clear width into which an associated winding wire end can only be introduced with a press fit. The opening thus tapers proceeding from a first opening region towards a second opening region, wherein it can be provided in particular that the associated winding wire end is moved from the first opening region of large clear width into the second opening region of smaller clear width by moving the positioning element relative to the switching unit and thereby is fixed in the opening with a press fit.

The second opening region, as compared to the first opening region, can be approached to a connecting point of an associated connecting conductor so that the winding wire end, when it is arranged in the second opening region with a press fit, is approached to the associated connecting point of the connecting conductor and preferably is in abutment with the connecting point.

The first opening region for example can have a circular cross-section, while the second opening region for example extends from the first opening region in the manner of a channel (with opening edges extending parallel to each other).

Different embodiments of the positioning element are conceivable and possible.

In one or more embodiments, the positioning element may be arranged on the component of the electric motor before the switching unit is arranged on the component of the electric motor. In this case, the positioning element preferably remains on the component of the electric motor after the winding wire ends have been connected with the associated connecting conductors of the switching unit. The positioning element may be part of the electric motor without adopting a function for the electrical operation of the electric motor after the assembly.

In this variant it is obtained that the positioning element initially is arranged on the component of the electric motor, for example on the stator of the electric motor, in order to then arrange the switching unit on the component by interposition of the positioning element. When the switching unit has been arranged on the component of the electric motor, the positioning element may be moved, in particular be pivoted to the switching unit in order to urge the winding wire end into abutment with the connecting conductors of the switching unit and to connect it to the connecting conductors for example by means of welding, in particular laser welding.

To guide the winding wire ends from the component of the electric motor towards the switching unit, the positioning element in this variant preferably includes positioning openings through which the winding wire ends are guided when the positioning element is arranged on the component of the electric motor. By engagement into the positioning openings, the winding wire ends are operatively connected to the positioning element so that during a relative movement between the positioning element and the switching unit the winding wire ends are urged into abutment with the connecting conductors of the switching unit.

The positioning openings are formed for example in a disk-shaped body of the positioning element. The positioning openings may be round or for example extend longitudinally along the body. For example, the positioning openings may be directed radially to the axis of rotation or also tangentially to the axis of rotation, which may facilitate the introduction and lead-through of the winding wire ends on attachment of the positioning elements to the component of the electric motor.

The positioning openings may include constrictions, as has been described above for the openings of the base body of the switching unit.

In an alternative variant, the switching unit may also be arranged on the component of the electric motor without the interposition of a positioning element. In this case, the positioning element for example may be part of a tool separate from the electric motor, for example on a winding line, and for example be urged into abutment with the associated connecting conductors of the switching unit via pressing elements protruding from a disk-shaped body. The positioning element in turn for example may be pivoted towards the switching unit about an axis of rotation, wherein in this case, too, the axis of rotation for the movement between positioning element and switching unit may correspond to the axis of rotation of the rotor to the stator of the electric motor.

The component of the electric motor, on which the teeth and the coil windings arranged on the teeth are formed, for example realizes a stator of an electric motor. In this case, the electric motor may be configured for example as a brushless DC motor in which the rotor carries permanent magnet poles. The electric motor may be of three-stranded construction, and correspondingly the switching unit may interconnect the coil windings at the stator to obtain three strands to be energized in a commuted way.

The object is also achieved by an assembly for manufacturing an electric motor. Such an assembly comprises:
- a component of an electric motor, which includes a plurality of teeth and coil windings formed by winding wire portions, which are arranged on the teeth, wherein the winding wire portions protrude from the coil windings by means of winding wire ends, and
- a switching unit which includes an array of connecting conductors and which is to be arranged on the component of the electric motor, wherein at least some of the winding wire ends are to be connected to the connecting conductors of the switching unit.

There is also provided a positioning element which may be operatively connected to the winding wire ends, wherein the positioning element and the switching unit are movable relative to each other along a plane of movement in order to bring the winding wire ends into abutment with the connecting conductors.

The advantages and advantageous embodiments described above for the method are also analogously applied to the assembly.

BRIEF DESCRIPTION OF THE DRAWINGS

The idea underlying the invention will be explained in detail below with reference to the exemplary embodiments illustrated in the Figures, in which:

FIG. 9 shows a schematic view of an electric motor in the form of a brushless DC motor;

DETAILED DESCRIPTION

Figure 1A:
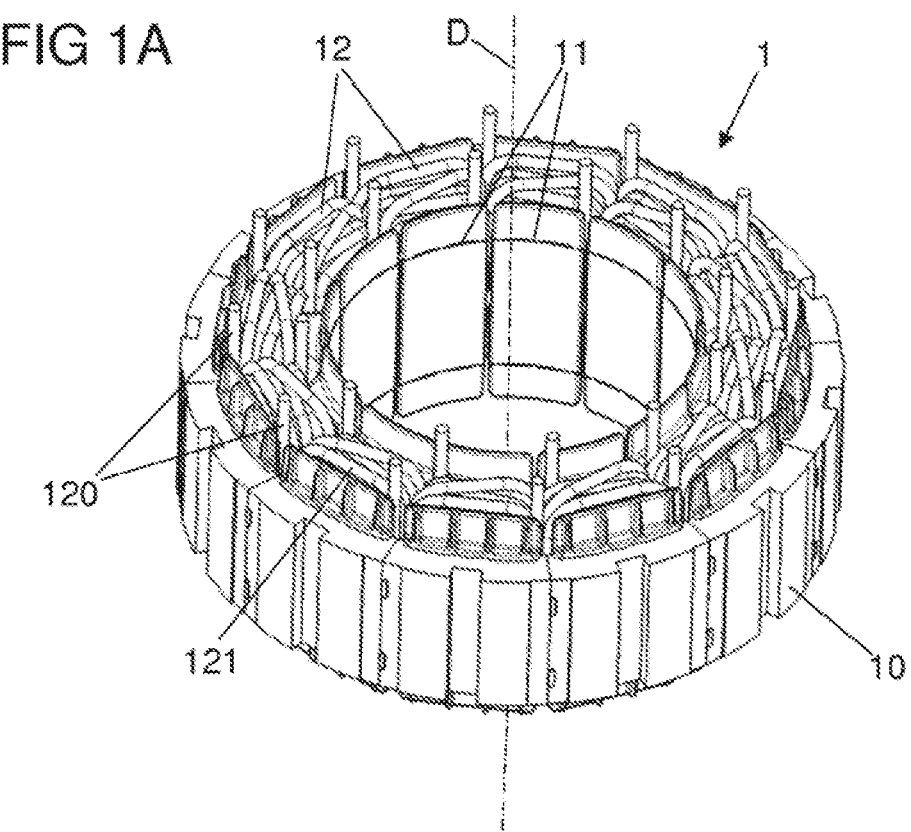
FIG. 1A shows a perspective view of a component of an electric motor in the form of a stator.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In such a method a component of an electric motor is provided, which includes a plurality of teeth and coil windings formed by winding wire portions, which are arranged on the teeth. On the component of the electric motor a switching unit is arranged, which includes an array of connecting conductors and serves for connecting winding wire ends of the winding wire portions forming the coil windings.

The component of the electric motor for example can be a stator on whose teeth coil windings are arranged. For realizing a brushless DC motor permanent magnet poles for example can be arranged on a rotor rotatably mounted relative to the stator, which effect a magnetic excitation field that interacts with a circulating rotary field generated by the coil windings and thereby generates a torque at the rotor.

The switching unit serves to connect winding wire ends of the winding wire portions forming the coil windings to each other so that individual winding wire ends are electrically short-circuited with each other and thus coil windings can be energized serially. A brushless DC motor for example can be of three-stranded construction, wherein in operation the three strands are energized in a commuted way so that a rotary field circulating in the manner of a three-phase machine is obtained at the stator.

For connecting winding wire ends of the coil windings, the switching unit includes an array of connecting conductors. When manufacturing the electric motor, the connecting conductors each are to be connected to associated winding wire ends of the winding wire portions so that coil windings associated to a common strand are short-circuited with each other via the switching unit.

Other connection techniques, for example welding methods such as laser welding, however are more sensitive to positional tolerances and require that during the production of the connection a winding wire end to be fixed is in direct abutment with an associated connecting conductor so that a reliable, contacting connection between the winding wire end and the connecting conductor can be produced.

From DE 20 2015 008 207 U1 an electric motor is known, in which coil windings are arranged on a stator and via winding wire ends are connected to connecting conductors of a switching unit. Via the switching unit the coil windings of the stator are interconnected in a predetermined way.

In an electric motor known from WO 2016/124636 A1 coil windings in the form of individual stator coils are arranged on a stator. The coil windings are interconnected via a switching unit. Contact wires of the switching unit are arranged to form an interconnection ring for coil ends of a stator winding and are connected via insulation displacement contacts.

In a brushless DC motor 1 a rotor 13 is rotatable relative to a stator 10 about an axis of rotation D. The rotor 13 carries at least two permanent magnet poles N, S and thus is permanently excited. The stator on the other hand carries a plurality of armature coils a-c.

The armature coils a-c each include a plurality of windings which are wound around a stator tooth and in the schematic representation of FIG. 2 are indicated by coil conductors a1, a2, b1, b2, c1, c2.

In general, an electric motor 1 in the form of a brushless DC motor 2N includes permanent magnet poles at the rotor 13 and three or more armature coils a, b, c at the stator 10.

In operation of the motor 1 a current is applied to the armature coils a-c so as to generate an armature field at the stator 10. The flow of current in the armature coils a-c here is electronically commuted by means of a control device 14 such that a circulating armature field is obtained at the stator 10, which is followed by the rotor 13 so that the rotor 13 is put into a rotary movement about the axis of rotation D.

In operation of the motor 1, the armature coils a-c may be actuated at different times via three phases L1, L2, L3 in order to generate the armature field circulating at the stator 10. In sensorless brushless DC motors, for example, two phases L1-L3 are energized, while the third phase L1-L3 serves as a ground line and serves for detecting a counter voltage induced in the associated armature coil a-c. This counter voltage can be evaluated in order to determine the rotor position of the rotor 13 and control the operation of the motor 1 with reference to the rotor position.

Figure 1B:
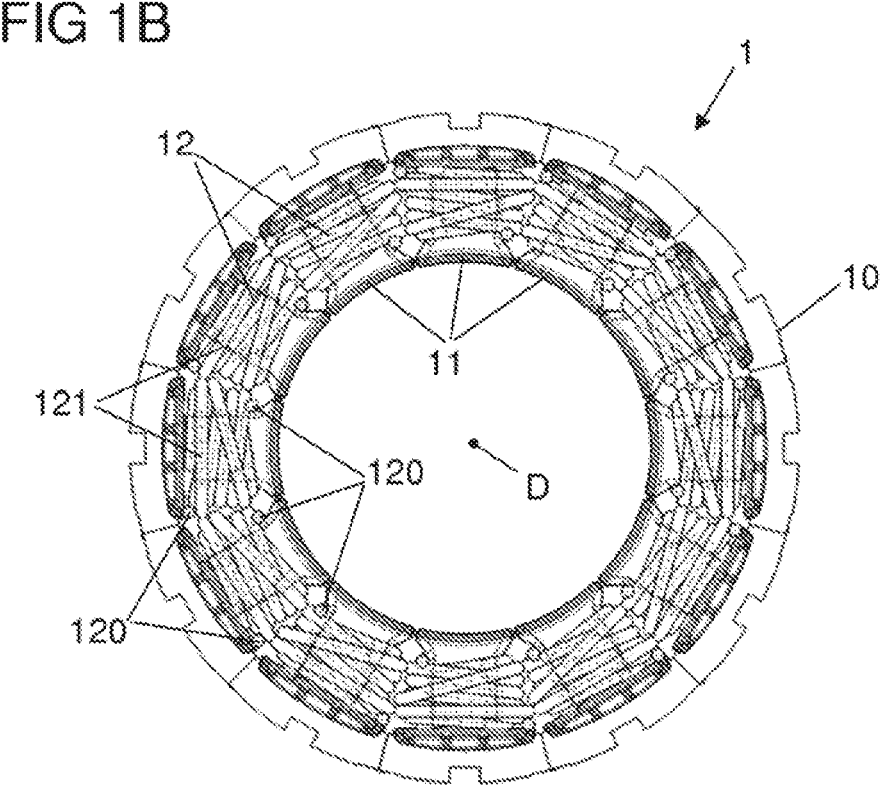
FIG. 1B shows a top view of the stator as shown in FIG. 1A.

FIGS. 1A and 1B show a concrete exemplary embodiment of a stator 10 of an electric motor 1 in the form of a brushless DC motor. The stator 10 includes a plurality of stator teeth 11 (in the illustrated exemplary embodiment twelve stator teeth 11) on which coil windings 12 are arranged. The stator teeth 11 are distributed around the axis of rotation D of the electric motor 1, about which the rotor 13 is rotatable relative to the stator 10 in operation of the electric motor 1, and in the illustrated exemplary embodiment each carry a coil winding 12 in the form of a concentrated winding.

The coil windings 12 each are wound through a winding wire portion 121 which protrudes from the respective coil winding 12 by means of winding wire ends 120, as this is shown in particular in FIG. 1A. To each coil winding 12 two winding wire ends 120 are associated, via which the coil windings 12 are electrically connected and energized in operation.

Figure 3A:
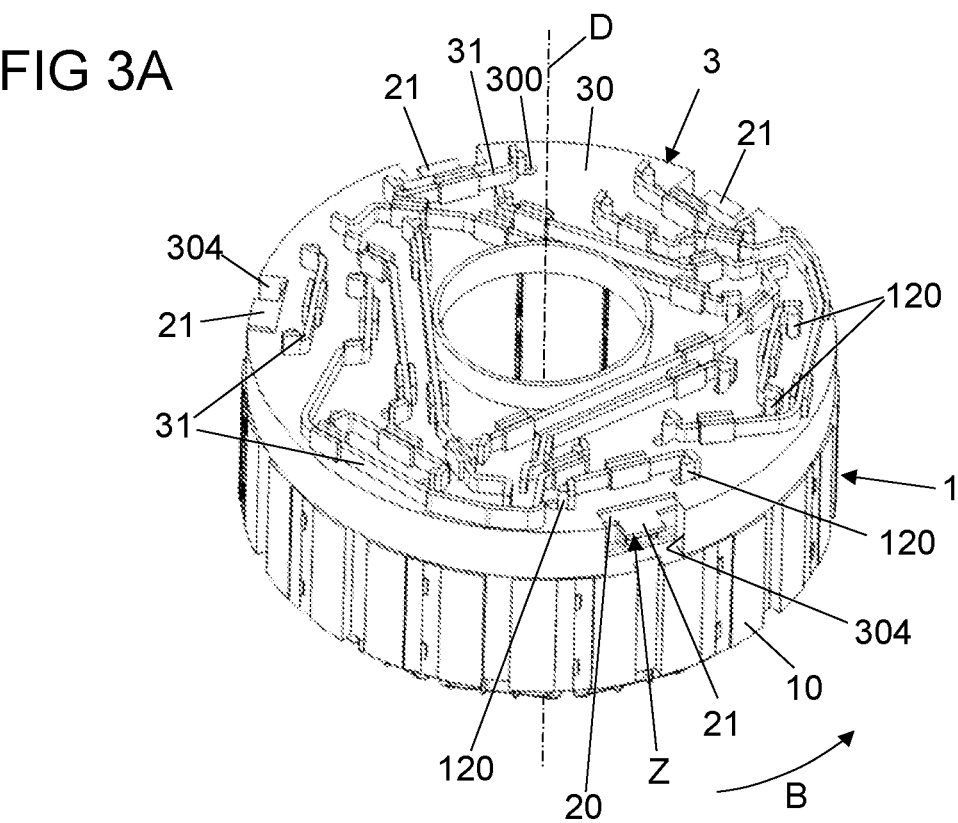
FIG. 3A shows the perspective view as shown in FIG. 2A, with a switching unit arranged on the stator.
Figure 3B:
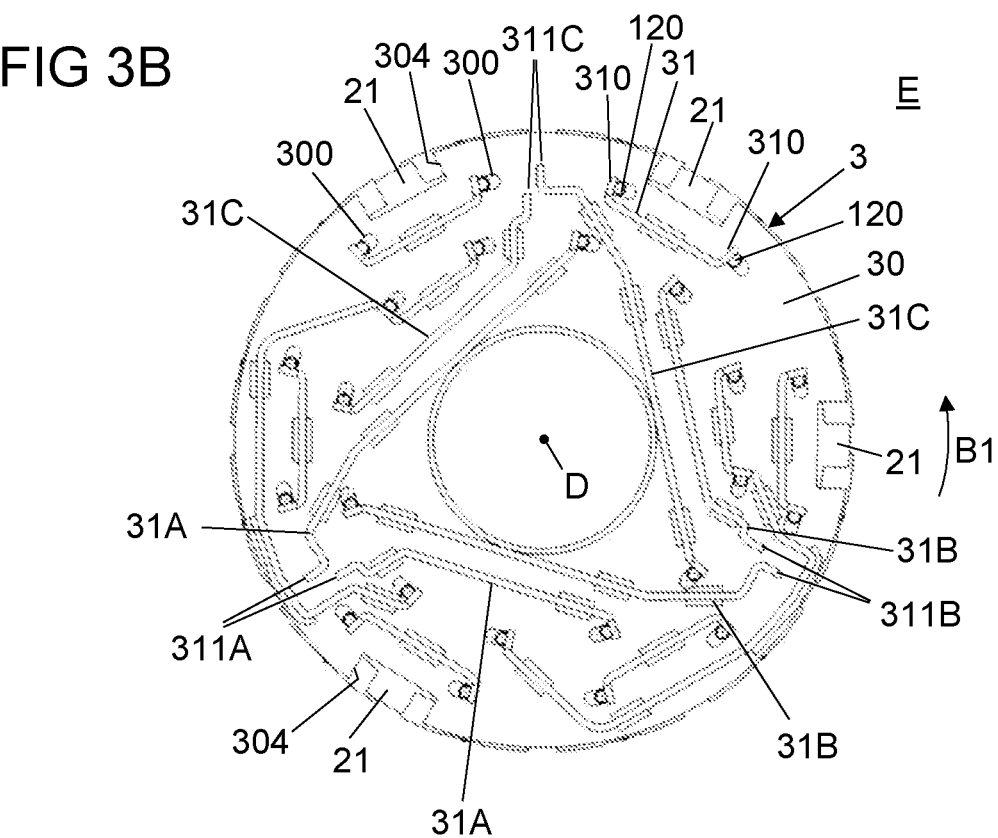
FIG. 3B shows a top view of the arrangement as shown in FIG. 3A.

Connecting the coil windings 12 is effected by interconnection via a switching unit 3, as it is shown in FIGS. 3A and 3B. The switching unit 3 includes a base body 30 which annularly extends around the axis of rotation D and is to be attached to the front side of the stator 10, from which the winding wire ends 120 protrude axially.

On the base body 30 connecting conductors 31 in the form of current bars attached to the base body 30 are arranged, which serve to electrically interconnect winding wire ends 120 of the coil windings 12 so that three strands of coil windings 12 are formed for a three-phase energization of the electric motor 1.

As is shown in particular in the top view of FIG. 3B, the connecting conductors 31 serve for electrically short-circuiting two or three winding wire ends 120 with each other. There are also three pairs 31A, 31B, 31C of connecting conductors 31, which include connecting points 311A, 311B, 311C for connecting the three phases L1, L2, L3 (see FIG. 9) in order to energize the three strands of the coil windings 12 in a commutated way for generating a rotary field at the stator 10.

In the mounted position, the winding wire ends 120 of the coil windings 12 reach through the base body 30 of the switching unit 3 at openings 300 and thus extend through the base body 30 towards the side of the base body 30 facing away from the stator 10, on which the connecting conductors 31, 31A, 31B, 31C are arranged (hereinafter reference jointly is made to the connecting conductors 31, 31A, 31B, 31C as the connecting conductor 31). On this side facing away from the stator 10 the winding wire ends 120 each are electrically connected to a connecting point 310 of an associated connecting conductor 31 so that the coil windings 12 thereby are properly interconnected to each other.

Figure 2A:
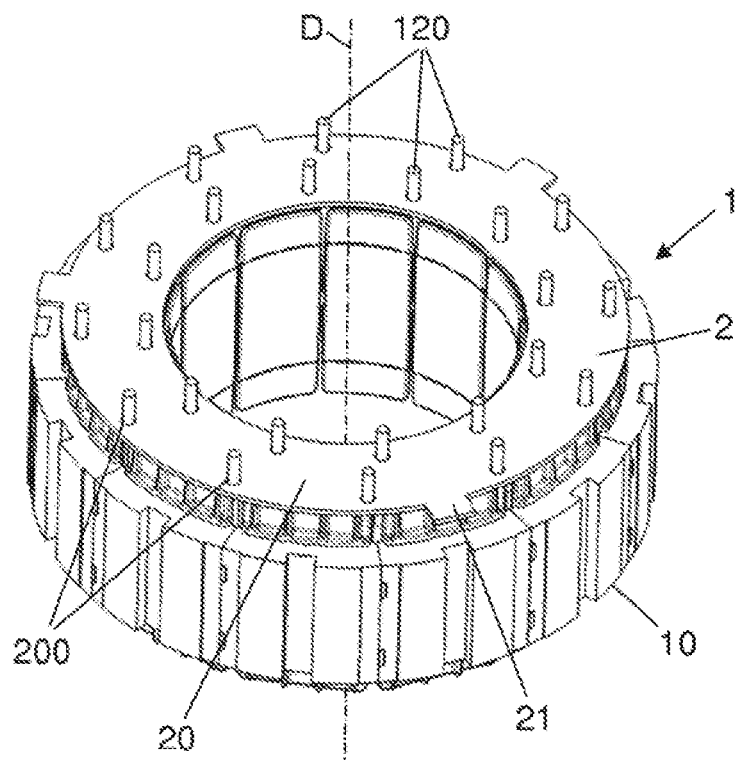
FIG. 2A shows the perspective view as shown in FIG. 1A, with a positioning element arranged on the stator.
Figure 2B:
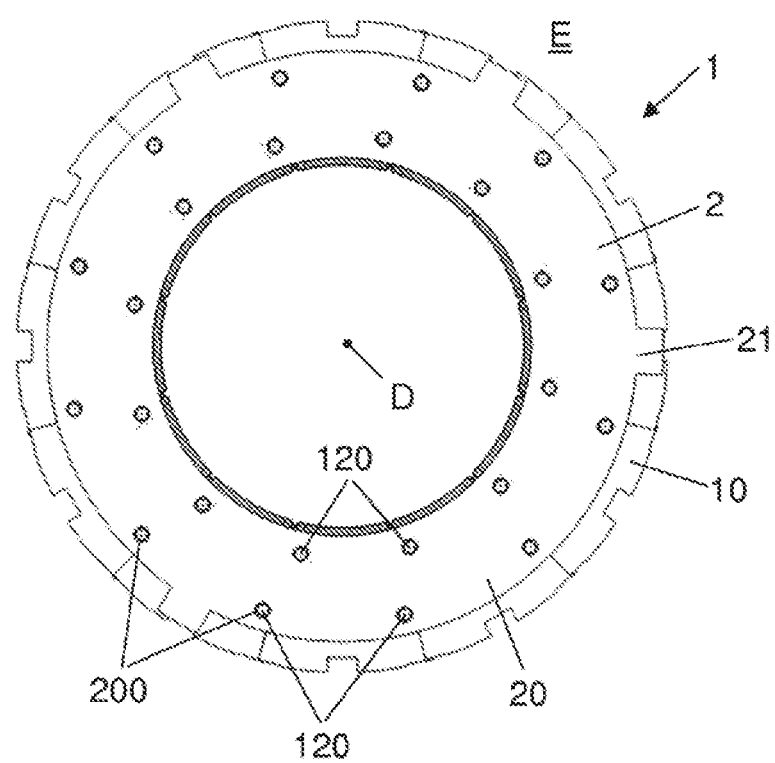
FIG. 2B shows a top view of the arrangement as shown in FIG. 2A.

To be able to use a welding method, in particular laser welding, for connecting the winding wire ends 120 to the connecting conductors 12, it is required that for producing the connection the winding wire ends 120 are in abutment with the connecting points 310 of the associated connecting conductors 31. For this purpose, a positioning element 2 is provided in the exemplary embodiment shown in FIGS. 1A, 1B to 3A, 3C, which is attached before attaching the switching unit 3 to the stator 10, as this is shown in FIGS. 2A and 2B.

The positioning element 2 includes a disk-shaped body 20 made of an electrically insulating material (e.g. a plastic material) in which positioning openings 200 are formed, through which the winding wire ends 120 of the coil windings 12 are guided on attachment of the positioning element 2 to the stator 10. When the positioning element 2 has been attached to the stator 10, the winding wire ends 120 extend through the body 20 and axially protrude from the positioning element 2, as this is shown in FIG. 2A.

After attachment of the positioning element 2, the switching unit 3 is attached to the stator 10 with the positioning element 2 disposed on the stator 10, as is shown in FIGS. 3A and 3B. The switching unit 3 thus extends around the positioning element 2 with its base body 10 and encloses the positioning element 2 on the stator 20 such that the positioning element 2 is pivotable relative to the switching unit 3 about the axis of rotation D at least over a certain distance.

On attachment of the switching unit 3 to the stator 10, the winding wire ends 120 are guided through openings 300 in the form of oblong holes in the base body 30, as this is shown in FIGS. 3A and 3B. The winding wire ends 120 thereby get into the region of the connecting conductors 31 and can be connected to the connecting points 310 of the connecting conductors 31.

To be able to produce a reliable electrical connection between the winding wire ends 120 and the associated connecting points 310 of the connecting conductors 31, for example by using a welding method, in particular laser welding, the positioning element 2 is provided, which by engagement of the winding wire ends 120 into the positioning openings 200 in the body 20 is operatively connected to the winding wire ends 120 and by pivoting in a plane of movement E about the axis of rotation D relative to the switching unit 3 moves the winding wire ends 120 relative to the connecting conductors 31 so that the winding wire ends 120 are urged into abutment with the connecting points 310 of the connecting conductors 31.

In particular, after attachment of the switching unit 3 to the stator 10, the positioning element 2 in the exemplary embodiment as shown in FIGS. 1A, 1B to 3A, 3B is pivoted in a direction of movement B1 (see FIG. 3B) relative to the switching unit 3 so that the winding wire ends 120 are moved in the direction of the associated connecting points 310 of the connecting conductors 31. For this purpose, for example, actuating elements 21 of the positioning element 2 can be engaged manually, which actuating elements radially protrude from the body 20 and are accessible from outside via cutouts 301 in the base body 30 of the switching unit 3.

When the winding wire ends 120 have been brought into abutment with the associated connecting points 310 of the connecting conductors 31, a connection between the winding wire ends 120 and the connecting conductors 31 can be produced for example by means of laser welding so that the winding wire ends 120 and thereby the coil windings 12 are properly interconnected with each other.

Due to the fact that all winding wire ends 120 are jointly arranged on the positioning element 2 and can jointly be moved by deflecting the positioning element 2, the winding wire ends 120 in one working step can jointly be brought into abutment with the associated connecting points 310 of the connecting conductors 31. A reliable, loadable connection with the associated connecting conductors 31 can subsequently be produced in an automatable way, for example by laser welding.

Figure 4A:
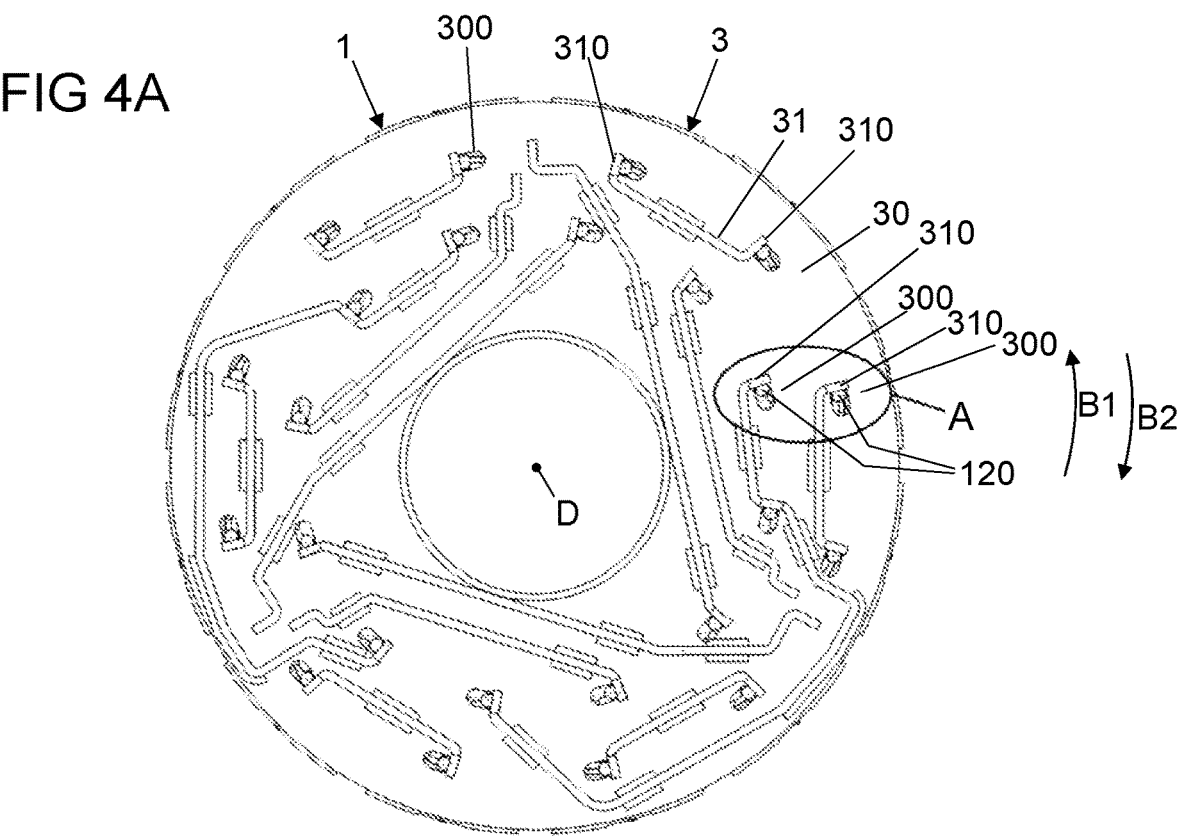
FIG. 4A shows a top view of another exemplary embodiment of a switching unit on a stator.
Figure 4B:
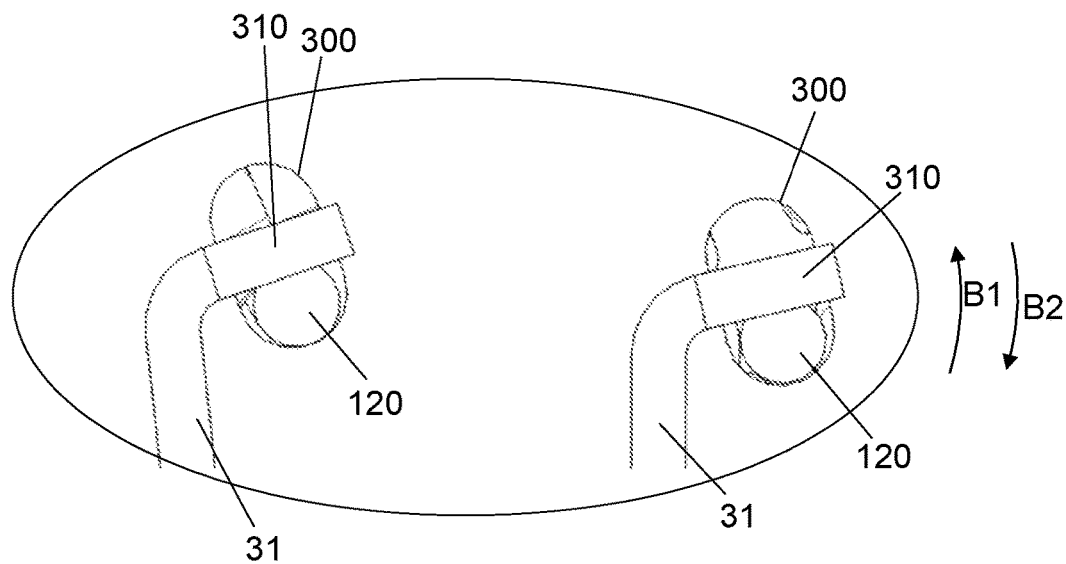
FIG. 4B shows an enlarged view in the section A as shown in FIG. 4A.

In the exemplary embodiment as shown in FIGS. 1A, 1B to 3A, 3B and also in the exemplary embodiment shown in FIGS. 4A and 4B, the winding wire ends 120 lie in openings 300 of the base body 30 of the switching unit 3 with a clearance. This facilitates the attachment of the switching unit 3 to the stator 10. By a relative movement between the positioning element 2 and the switching unit 3, the winding wire ends 120 then are moved in the openings 300 and thereby brought into abutment with the associated connecting points 310 of the connecting conductors 31.

What is decisive here is a relative movement between the positioning element 2 and the switching unit 3. For example, the switching unit 3 can be retained at the stator 10 and the positioning element 2 can be moved in a direction of movement B1. It is also possible, however, that the positioning element 2 remains stationary and the switching unit 3 is moved in an opposite direction of movement B2 (see FIGS. 4A and 4B). Finally, it is also conceivable and possible that both the positioning element 2 and the switching unit 3 are moved (towards each other).

In the exemplary embodiments shown in FIGS. 1A, 1B to 4A, 4B the openings 300 in the base body 30 of the switching unit 3 are configured as oblong holes. This provides for a tolerance-insensitive attachment of the switching unit 3 to the winding wire ends 120. The abutment between the winding wire ends 120 then is produced by a relative movement between the positioning element 2 and the switching unit 3.

The openings 300 can also have another shape, for example a trapezoidal shape or a circular segmented shape.

The positioning openings 200 in the disk-shaped body 20 of the positioning element 2 are circular in the exemplary embodiment shown in FIGS. 2A, 2B. It is also conceivable and possible, however, that the positioning openings 200 have the shape of an oblong hole, a trapezoidal shape or a circular segmented shape in order to facilitate the attachment of the positioning element 2 to the stator 10 and the guiding of the winding wire ends 120 through the positioning openings 200.

Figure 5A:
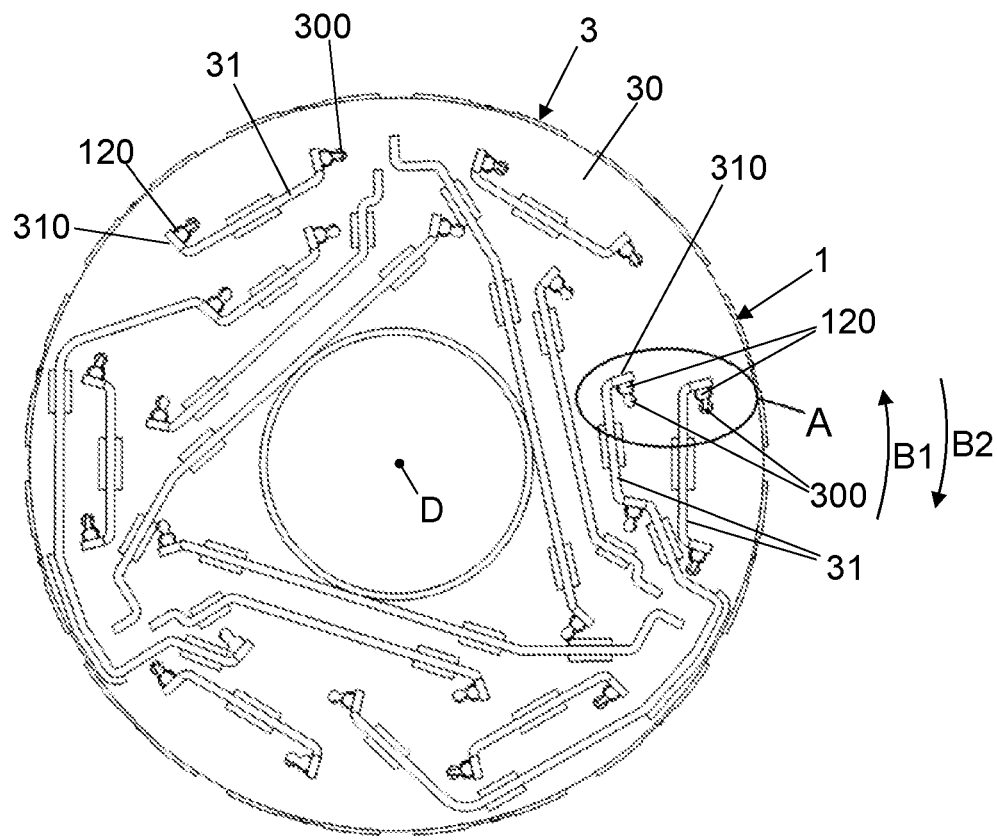
FIG. 5A shows a view of another exemplary embodiment of a switching unit on a stator.
Figure 5B:
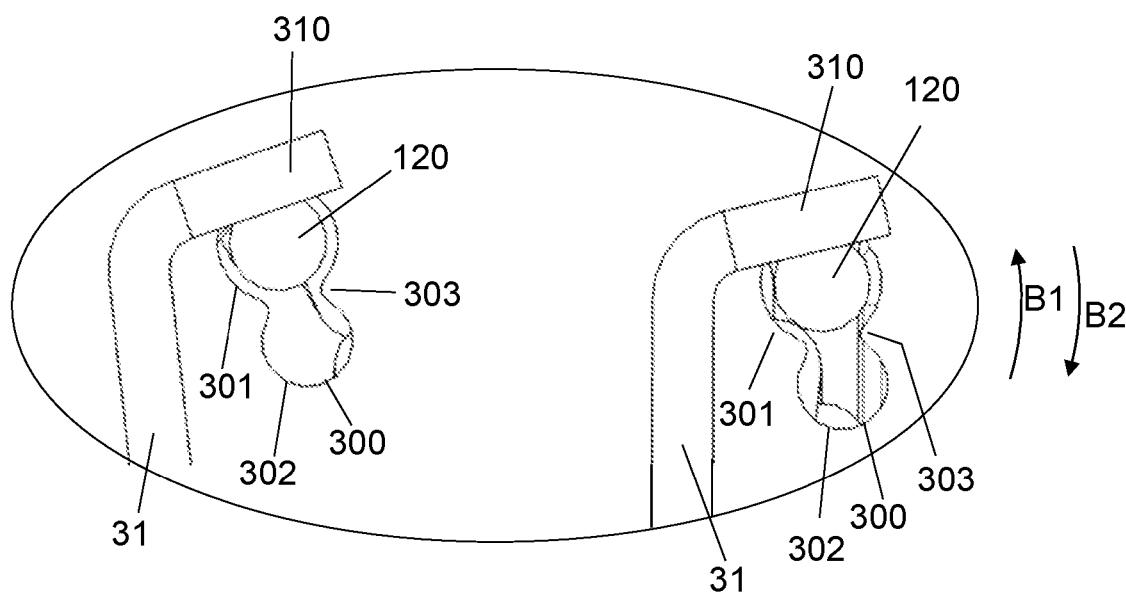
FIG. 5B shows an enlarged view in the section A as shown in FIG. 5A.

In an exemplary embodiment shown in FIGS. 5A, 5B the openings 300 in the base body 30 of the switching unit 3 each include a constriction 303 which functionally separates opening regions 301, 302 of the opening 300 and in particular has a clear width which is smaller than the diameter of the winding wire formed by a round wire. When the positioning element 2 moves relative to the switching unit 3, a winding wire end 120 can be moved for example out of an opening region 302 through the constriction 303 into the other opening region 301 so as to be brought into abutment with the connecting point 310 of the associated connecting conductor 31. By means of the constriction 303, the winding wire end 120 then can be arrested in the opening region 301 and thus cannot automatically move out of abutment with the connecting point 310.

Each opening 300 can include one or more constrictions 303 for separating a plurality of opening regions 301, 302 from each other.

The positioning openings 200 in the body 20 of the positioning element 2 likewise can include constrictions in order to thereby achieve an arrestment of the winding wire ends 120 in a particular position.

Figure 10A:
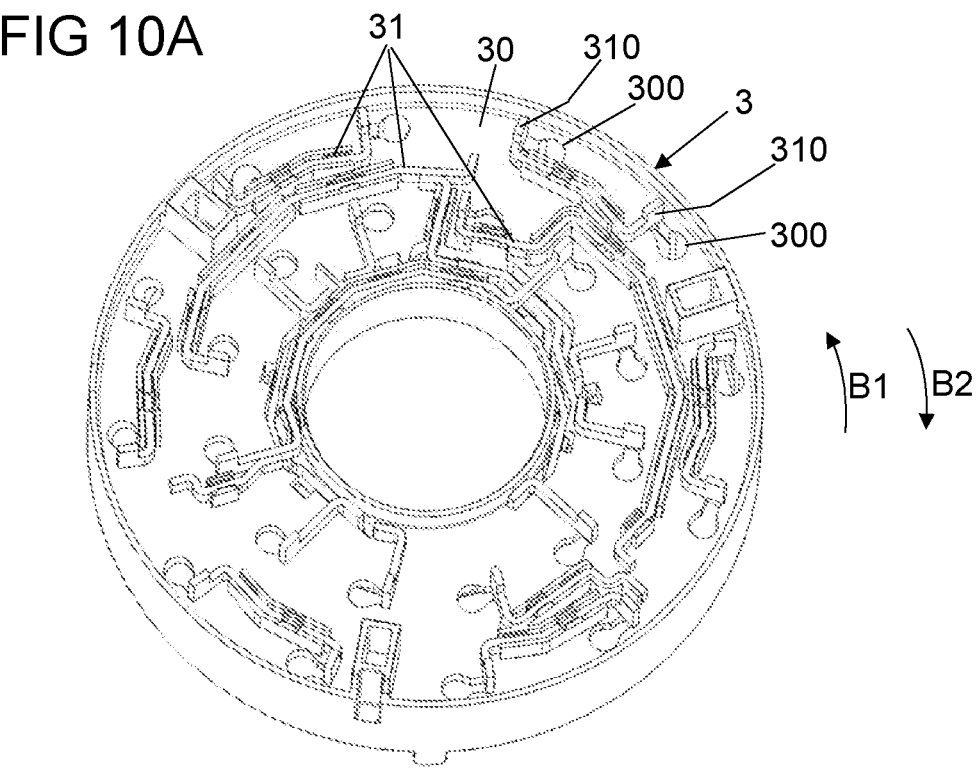
FIG. 10A shows a view of another exemplary embodiment of a switching unit.
Figure 10B:
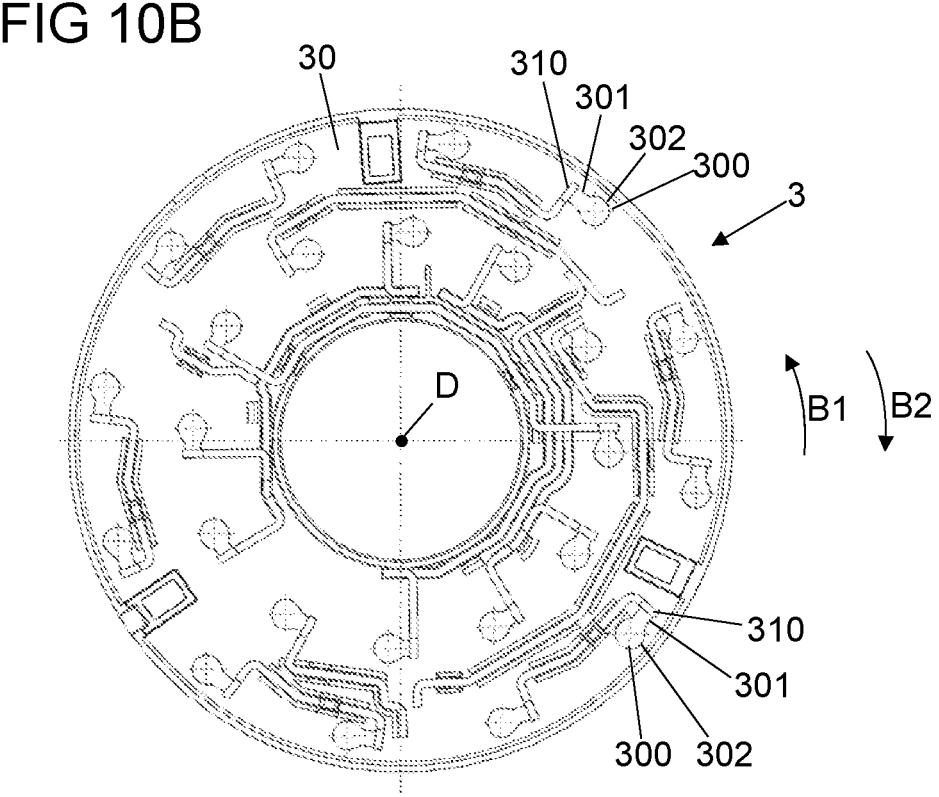
FIG. 10B shows a top view of the switching unit as shown in FIG. 10A.

In another exemplary embodiment of a switching unit 3, which is shown in FIGS. 10A, 10B, the openings 300 have different opening regions 301, 302 which differ in their clear width.

In this exemplary embodiment, each opening 300 has a first opening region 302 which is remote from an associated connecting point 310 of the associated connecting conductor 31 and has a circular cross-section of comparatively large clear width. The circular opening region 302 here is so large that an associated winding wire end 120 can be introduced into this opening region 302 with a clearance.

The first opening region 302 each is adjoined by a second opening region 301 which is directed from the first opening region 302 towards the associated connecting point 310 of the associated connecting conductor 31 and extends from the first opening region 302 in the manner of a channel. The second opening region 301, as compared to the first opening region 302, has a reduced clear width which is so small that upon movement into the second opening region 301 the associated winding wire end 102 adopts a press fit in the second opening region 301 and with this press fit thus is brought into abutment with the associated connecting point 310 of the connecting conductor 31.

Due to the relative movement of the switching unit 3 to an associated positioning element 2, each winding wire end 120 in turn is moved within the respectively associated opening 300 and thereby is moved from the first opening region 302 into the second opening region 301 of the respective opening 300 and thus brought into abutment with the connecting point 310 of the associated connecting conductor 31.

Figure 6:
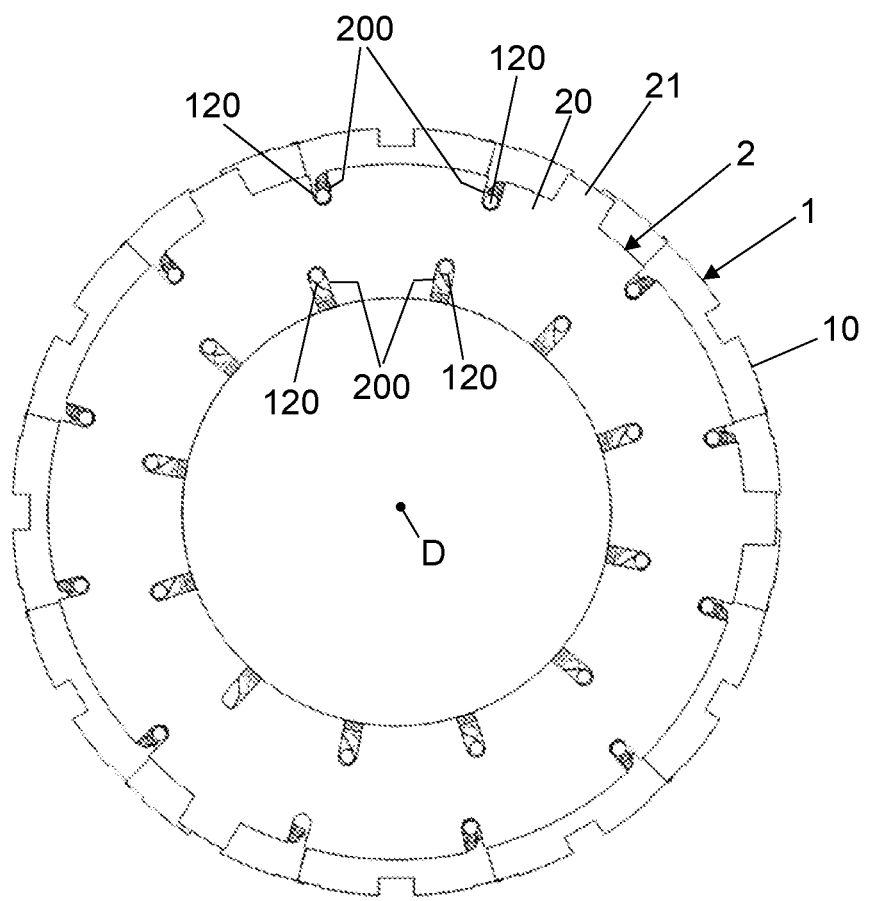
FIG. 6 shows a view of another exemplary embodiment of a positioning element.

FIG. 6 shows an exemplary embodiment of a positioning element 2 which includes positioning openings 200 in the form of longitudinally extending openings directed radially to the axis of rotation D. The positioning openings 200 are open towards the edge, which can facilitate the introduction of the winding wire ends 120.

The positioning openings 200 can longitudinally extend radially or tangentially to the axis of rotation D. However, the positioning openings 200 can also have another shape, e.g. a circular shape, a trapezoidal shape or a circular segmented shape.

The different exemplary embodiments of positioning elements 2 and switching units 3 described above can be combined with each other in any way. The exemplary embodiments as shown in FIGS. 1A, 1B to 6 have in common that the positioning element 2 is attached to the stator 10 before the switching unit 3 and after the subsequent attachment of the switching unit 3 is enclosed by the base body 30 of the switching unit 3. After producing the connection between the winding wire ends 120 and the connecting conductors 31, the positioning element 2 remains interposed between the stator 10 and the switching unit 3 and thus becomes part of the electric motor 1, but without adopting an essential function for the electrical operation of the electric motor 1.

Figure 7A:
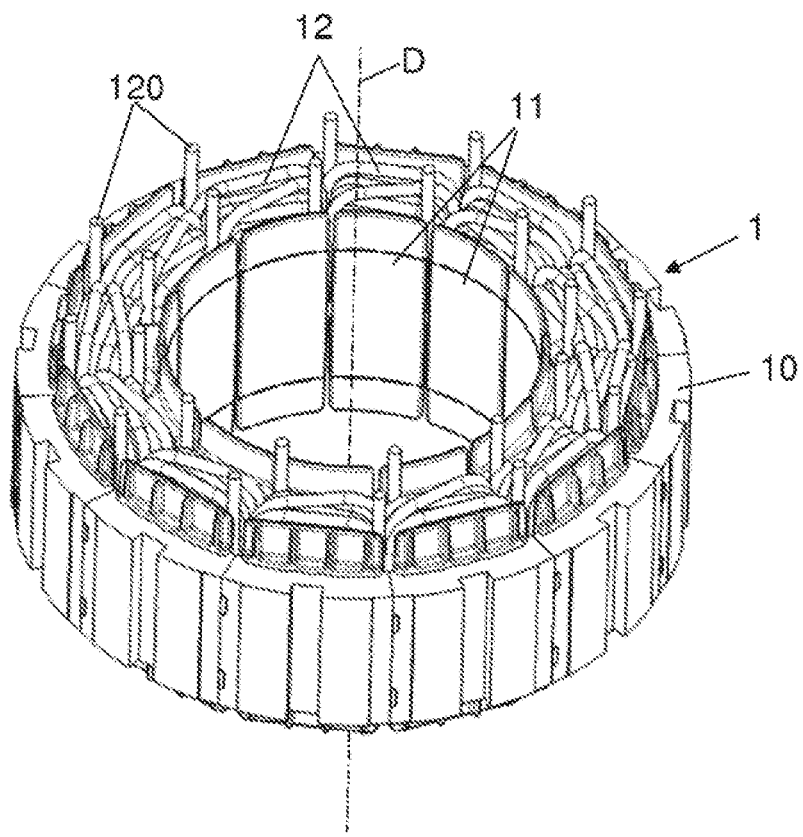
FIG. 7A shows a view of a component of an electric motor in the form of a stator.
Figure 7B:
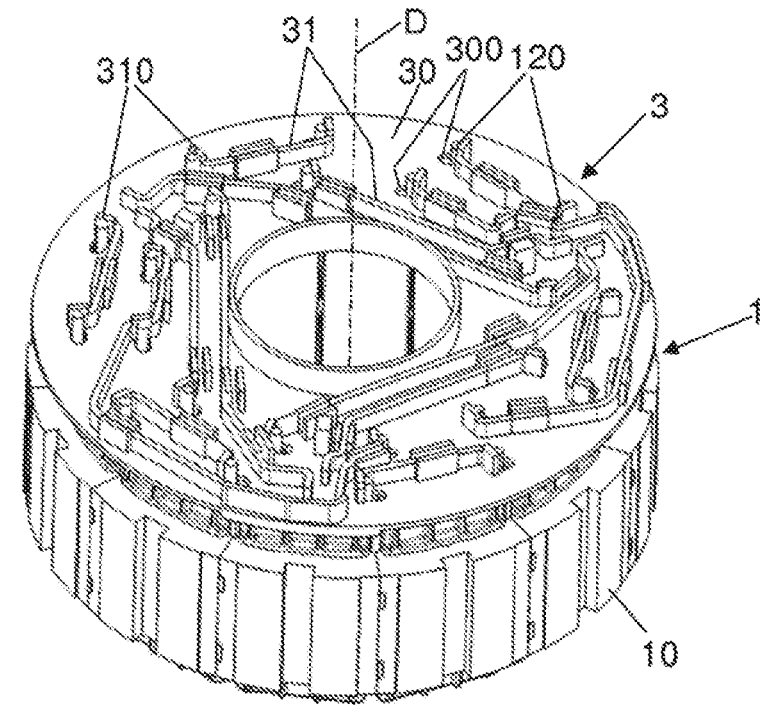
FIG. 7B shows the view as shown in FIG. 7A, with a switching unit arranged on the stator.
Figure 7C:
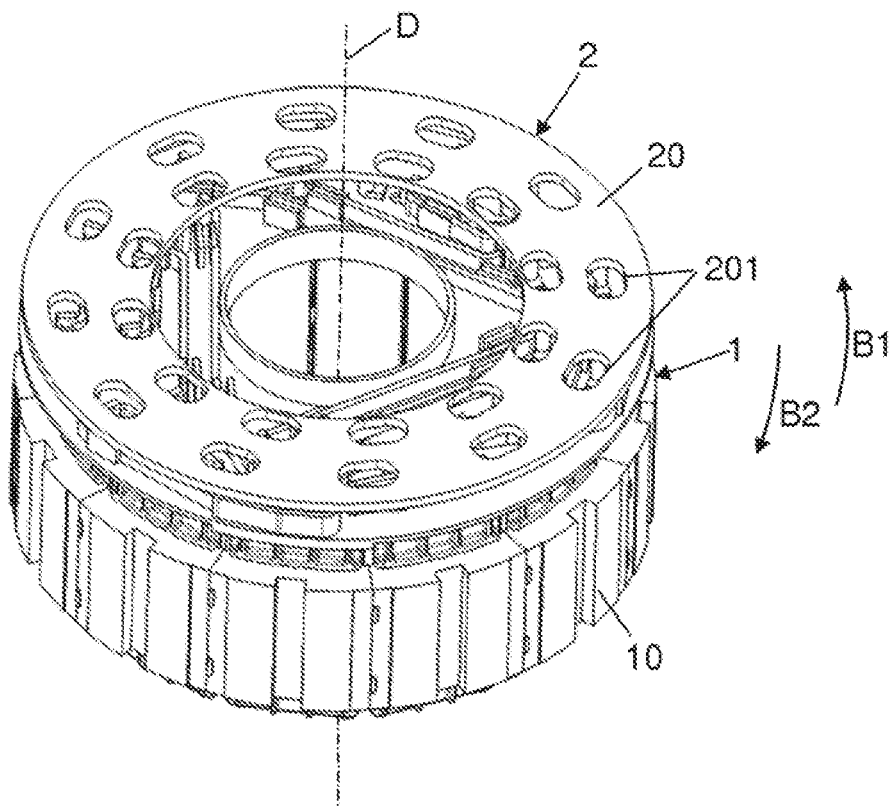
FIG. 7C shows the view as shown in FIG. 7B, with a positioning element acting on winding wire ends at the switching unit.

In the exemplary embodiment shown in FIGS. 7A to 7C and 8, the switching unit 3 is attached to the stator 10 before the positioning element 2, as this is shown in the sequence of FIGS. 7A and 7B. In turn, winding wire ends 120 of coil windings 12 of the stator 10 are guided through the base body 30 of the switching unit 3 and, after attachment of the switching unit 3 to the stator 10, reach through openings 300 in the base body 30.

Figure 8:
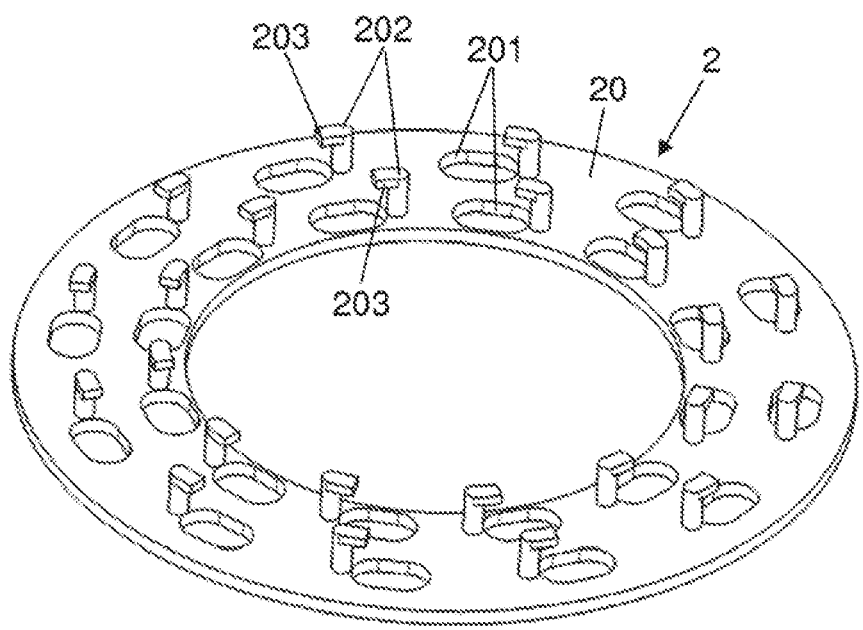
FIG. 8 shows a separate view of the positioning element as shown in FIG. 7C.

To urge the winding wire ends 120 into abutment with the associated connecting points 310 of the connecting conductors 31 for producing the connection between the winding wire ends 120 and the connecting conductors 31, the positioning element 2, as shown in FIG. 8, includes pressing elements 202 which axially protrude from a ring-shaped body 20 of the positioning element 2 and via end portions 203 in the form of noses protruding along a circumferential direction (directed around the axis of rotation D) act on the winding wire ends 120. Upon movement of the positioning element 2 and the switching unit 3 relative to each other, each end portion 203 gets into abutment with a winding wire end 120 and urges the same against an associated connecting point 310. Via openings 201 in the ring-shaped body 20, a laser beam then can be directed onto the connecting point 310 for the purpose of laser welding in order to produce a welding connection between the respective winding wire end 120 and the connecting point 310.

In the exemplary embodiment as shown in FIGS. 7A to 7C and 8, it is in turn possible to either move the positioning element 2 in a direction of movement B2 or to move the switching unit 3 in an opposite direction of movement B1. It is also conceivable and possible to move the positioning element 2 and the switching unit 3 towards each other.

In the exemplary embodiment as shown in FIGS. 7A to 7C and 8, the positioning element 2 does not become part of the electric motor 1, but can be removed from the switching unit 3 after producing the connection. In this case, the positioning element 2 for example can be part of a winding line in which the coil windings 12 initially are mounted on the stator 10 by a suitable winding apparatus, the switching unit 3 then is attached to the stator 10 and is connected to the winding wire ends 120 by using the positioning element 2.

Such a positioning element 2 used separately from the electric motor 1 can be used together with all exemplary embodiments of the switching unit 3, for example as shown in FIGS. 4A, 4B, FIGS. 5A, 5B and FIGS. 10A, 10B.

The idea underlying the invention is not limited to the exemplary embodiments described above, but can also be realized in principle in a completely different way.

In particular, via a positioning element it is also possible for example to produce an interconnection of windings on a rotor.

The electric motor is not necessarily configured as a brushless DC motor, but can also have another type of motor construction.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 electric motor
10 motor component (stator)
11 stator teeth
12 coil winding
120 winding wire end
121 winding wire portion
13 rotor
14 control device
2 positioning element
20 disk body
200 positioning opening
201 opening
202 pressing element
203 end portion
21 actuating element
3 switching unit
30 base body
300 opening
301, 302 opening region
303 constriction
304 cutout
31, 31A-31C connecting conductor (conductor path)
310 connecting point (conductor path end)
311A, 311B, 311C connecting point
a, b, c armature coil
a1, a2, b1, b2, c1, c2 coil conductor
B1, B2 direction of movement
D axis of rotation
E plane of movement
L1, L2, L3 phase While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method for mounting a switching unit on a component of an electric motor, the method comprising:
providing the component of the electric motor, wherein the component includes a plurality of teeth and coil windings formed by winding wire portions arranged on the plurality of teeth, wherein the winding wire portions include winding wire ends, wherein the winding wire ends protrude from the coil windings;
arranging the switching unit, wherein the switching unit includes connecting conductors disposed on the component; and
connecting at least one of the winding wire ends to the connecting conductors of the switching unit, by moving a positioning element, operatively connected to the winding wire ends, and the switching unit relative to each other along a plane of movement so that at least one of the winding wire ends abut at least one of the connecting conductors.

2. The method of claim 1, further comprising welding at least one of the winding wire ends to at least one of the connecting conductors.

3. The method of claim 1, wherein the connecting step includes moving the winding wire ends along the plane of movement.

4. The method of claim 1, wherein the connecting step includes pivoting the positioning element and the switching unit relative to each other about an axis of rotation, wherein the axis of rotation extends perpendicularly to the plane of movement.

5. The method of claim 1, wherein the switching unit includes a base body defining a plurality of openings, wherein the arranging step includes guiding at least one of the winding wire ends through at least one of the openings.

6. The method of claim 5, wherein that the openings each include a first opening region and a second opening region, separated by a constriction, wherein the connecting step includes moving one of the winding wire ends from the first opening regions to the second opening region.

7. The method of claim 1, further comprising arranging the positioning element to the component of the electric motor before the arranging step.

8. The method of claim 7, wherein arranging the positioning element includes guiding the winding wire ends through positioning openings defined by a body of the positioning element.

9. The method of claim 1, wherein the moving step includes actuating an actuating portion protruding from a body of the positioning element.

10. The method of claim 1, wherein moving pressing elements extending from a body of the positioning element to bias the winding wire ends towards the connecting conductors.

11. An assembly for manufacturing an electric motor, the assembly comprising:
a component of the electric motor including a plurality of teeth and coil windings formed by winding wire portions, arranged on the plurality of teeth, wherein the winding wire portions include winding wire ends, wherein the winding wire ends protrude from the coil windings;
a switching unit configured to be arranged on the component and including connecting conductors, wherein at least one of the winding wire ends are configured to be connected to at least one of the connecting conductors; and
a positioning element configured to be operatively connected to the winding wire ends, wherein the positioning element and the switching unit are movable relative to each other along a plane of movement to move the winding wire ends so that at least one of the winding wire ends abut at least one of the connecting conductors.

12. The assembly of claim 11, wherein the winding wire ends extend perpendicularly to the plane of movement.

13. The assembly of claim 11, wherein the positioning element and the switching element are configured to be pivoted relative to one another about an axis of rotation, wherein the axis of rotation is perpendicular to the plane of movement.

14. The assembly of claim 11, wherein the switching unit includes a base body, wherein the base body defines a number of openings, wherein during assembly of the electric motor, at least one of the winding wire ends through at least one of the openings.

15. The assembly of claim 14, wherein the winding wire ends abut the connecting conductors on a side of the base body that faces away from the component.

16. The assembly of claim 14, wherein each of the openings have an elongated shape.

17. The assembly of claim 14, wherein at least one of the openings include a first region and a second region narrower than the first region, wherein as the positioning element moves relative to the switching element, at least one of the winding wire ends move from the first region to the second region.

18. The assembly of claim 14, wherein the base body has a disk shape.

19. The assembly of claim 11, wherein the component is a stator of the electric motor.

20. A method of assembling an electric motor including a stator, including teeth and wire coils disposed on the teeth and including a plurality of wire ends extending from the wire coils, a switching unit disposed on the stator and including connecting conductors, the method comprising:
provviding a positioning disk defining a plurality of apertures so that a wire end of the plurality of wire ends extends through an aperture of the plurality of apertures; and
moving the positioning disk relative to the switching unit so that said wire end of the plurality of wire ends moves to engage at least one of the connecting conductors.

* * * * *